Aug. 22, 1967 R. O. EASTMAN ET AL 3,337,809

APPARATUS FOR AUTOMATICALLY GATING SIGNALS TO ONE OF A PLURALITY OF BLOCKING OSCILLATORS

Original Filed June 28, 1961

INVENTORS
RICHARD O. EASTMAN
WILLIAM W. DYER
JOHN A. WATERBURY
WAYLAND A. CARLSON
RALPH H. MILLER, JR.

ATTORNEYS 3,337,809
APPARATUS FOR AUTOMATICALLY GATING SIGNALS TO ONE OF A PLURALITY OF BLOCKING OSCILLATORS

Richard O. Eastman, San Diego, William W. Dyer, La Mesa, John A. Waterbury and Wayland A. Carlson, San Diego, and Ralph H. Miller, Jr., La Mesa, Calif., assignors to the United States of America as represented by the Secretary of the Navy Original application June 28, 1961. Ser. No. 122,056. Divided and this application June 27, 1963, Ser. No. 291,224
2 Claims. (Cl. 328—55)

The invention described herein may be manufactured and used by or for the Government of the United States of America for governmental purposes without the payment of any royalties thereon or therefor.

The present invention is a divisional application of co-pending application Ser. No. 122,056 filed June 28, 1961, entitled, "Quantized Pulse Modulated Non-Synchronous Clipped Speech Multi-Channel Coded Communication System."

The present gating circuit is intended to be used with the subject matter of the aforesaid co-pending application and is necessary due to the short interval between pulses at the input to the gating circuit, i.e., faster than the recovery time of an ordinary gating circuit comprising, for instance, a blocking oscillator.

An object of the present invention is to provide an improved gating circuit.

A further object of the present invention is to provide an improved gating circuit wherein the recovery time of the gating circuit may be greater than the interval between input pulses to the circuit.

Another object of the present invention is to provide an improved gating circuit wherein the time interval between input pulses to the circuit may be less than the recovery time of the individual blocking oscillator of the gating circuit.

Other objects and many of the attended advantages of this invention will be readily appreciated as the same becomes better understood by reference to the following detailed description when considered in connection with the accompanying drawings wherein.

Figure 1:
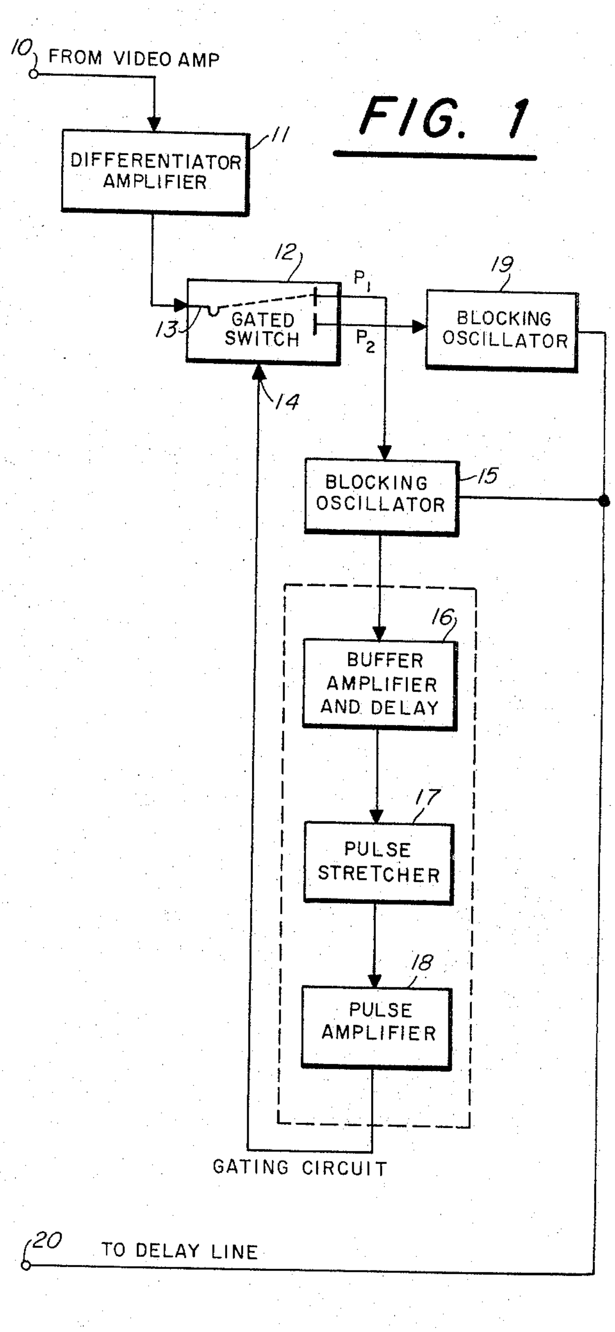
FIG. 1 is a block diagram of one embodiment of the gating circuit.

The embodiment set forth in FIG. 1 illustrates the gating circuit wherein an input from the video amplifier of co-pending application Ser. No. 122,056 is coupled in at input 10 to a differentiating amplifier 11. The output from the differentiating amplifier 11 is coupled to a gated switch 12 having a grid 13 and plates $P_1$ and $P_2$. In additional there is a focusing electrode at 14 which is adapted to move an electron beam between $P_1$ and $P_2$. The output of plate $P_1$ is connected to a blocking oscillator 15 and the output of the blocking oscillator coupled to a buffer amplifier and delay unit 16, thence to a pulse stretcher 17 the ouput of which is coupled to a pulse amplifier 18. Another output from the oscillator 15 is coupled directly to output 20. The output of the pulse amplifier is coupled back to the focusing electrode 14.

The output of plate $P_2$ is coupled to another blocking oscillator 19, the output of which is connected to output terminal 20 which is a utilized drive to a delay line as set forth in co-pending application Ser. No. 122,056.

*Operation*

Figure 2:
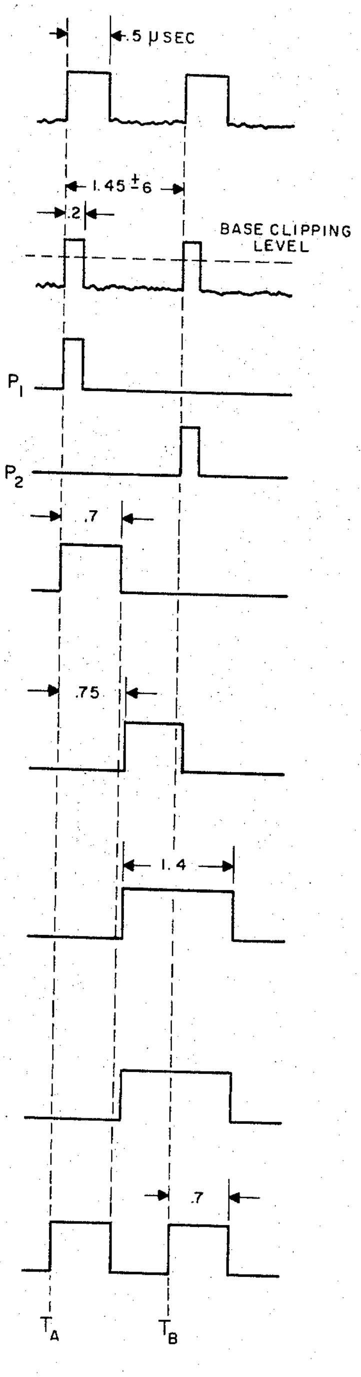
FIG. 2 is a timing diagram associated with the block diagram of FIG. 1.

When the receiver unit of co-pending application Ser. No. 122,056, is set for a maximum sensitivity, the video output from the receiver is composed of variable signals and noise spikes of 0.5 volt. Since the remaining circuitry of the master decoder unit of the aforesaid co-pending application generates pulses upon the reception of any trigger, noise effects must be minimized. This is accomplished by base clipping the noise spikes, as shown in FIG. 2. The gated switch 12 is biased below cut-off by the setting of a trigger level control, not shown. The amount of clipping is then determined by how far below cut-off the gated switch 12 is biased and by the magnitude of the signal presented to its grid 13. By adjusting various controls, an optimum condition can be established between desired signals and noise spikes and after testing the aforesaid controls by jamming tests, it was possible to obtain adequate operation of the system of co-pending application Ser. No. 122,056 when the desired signals exceeded noise or pulse jamming signals by only 25%.

The delay line 74 of co-pending application Ser. No. 122,056 is a major component of the master decoder unit and the circuity of the master decoding unit serves primarily to provide a high-amplitude low-impedance drive for this delay line. In ordinary operation a single blocking oscillator could provide this driving function, however, due to the decoding of the plus or minus 0.3 microsecond modulation from the input pulse trains, it is necessary to generate pulses 0.7 microsecond wide and as close together as 0.85 microsecond. The recovery characteristics of blocking oscillators preclude the use of a single unit for such rapid operation. Hence, it is necessary to provide two blocking oscillators which operate alternately when the fastest triggering becomes necessary. Therefore, a master blocking oscillator 15 is provided and a second blocking oscillator 19 is switched in only as needed. The timing of this circuitry is shown diagrammatically in FIG. 2.

In the operation of the master decoding unit of the aforesaid co-pending application Ser. No. 122,056 a pulse from the video amplifier is coupled in at 10 at times $T_A$ and $T_B$ and is differentiated in the differentiating amplifier 11 and base clipped. This pulse is then coupled to the grid and to plate $P_1$ which triggers blocking oscillator 15 thereby generating a 0.7-microsecond pulse. One output of blocking oscillator 15 is coupled to the output terminal 20 and the other output is applied to the gating circuit. The gating circuit comprises the buffer, amplifier and delay unit 16, pulse stretcher 17 and pulse amplifier 18. The gating circuits delay the pulse by 0.75 microsecond and then stretch the pulse to an effective width of 1.4 microseconds. The stretched pulse is then amplified in the pulse amplifier 18 and returned to the focusing electrode 14 of the gated switch 12, causing the beam to switch to $P_2$ during the gate intervals of 1.4 microseconds. This gate interval covers the modulation region of the succeeding adjacent channel, yet is narrow enough to insure recovery between alternate regions.

If an input pulse occurs during the 1.4 microsecond gating interval, it triggers blocking oscillator 19 which also generates a 0.7 microsecond pulse. The output of either block oscillator can drive the delay line of co-pending application Ser. No. 122,056 which is adapted to be coupled to output terminal 20.

The foregoing description of the present invention illustrates a gating circuit which is adapted to handle extremely high-speed input pulses wherein the time interval between pulses is less than the recovery time of the blocking oscillators used to generate the output pulses. In addition, the gating circuit is made up of conventional components which are readily obtainable and easily maintained.

Obviously, many modifications and variations of the present invention are possible in the light of the above teachings. It is, therefore, to be understood that within the scope of the appended claims the invention may be practiced otherwise than as specifically described.

What is claimed is:

1. A gating circuit comprising;
input means for coupling pulses thereto at a high rate;
gated switch means comprising an input means, first and second output elements and a focusing element so constructed and arranged that a conducting path exists selectively between said input element and said first and second output elements when said gated switch is activated;
blocking oscillator means connected to one of said first and second output elements for generating output pulses when triggered by an input pulse thereto;
delay means operatively receiving output pulses from said first blocking oscillator means for delaying the output pulses;
pulse stretcher means operatively receiving the output of said delay means for increasing the time width of said pulses;
said focusing element operatively receiving said stretched and delayed pulses from said pulse stretcher means and switching said beam between said input element and the other of said first and second output elements at a time determined by said stretched and delayed pulse width;
second blocking oscillator means operatively coupled to the other of said first and second output elements for generating output pulses when triggered by an input pulse; and
output terminal means operatively receiving output pulses from said first and second blocking oscillators.

2. A ring around gating circuit comprising;

input means for receiving time modulated pulses at a rapid rate;
gated switch means including a first input element, first and second output elements and a focusing means;
first blocking oscillator means operatively coupled to one of said first and second output elements and receiving pulses therefrom when pulses are coupled from said input element to said first output element;
delay means operatively receiving the output of said first blocking oscillator means for delaying said pulses a predetermined amount;
pulse stretching means operatively coupled to said delay means for increasing the pulse width of said pulses;
said focusing means operatively receiving said stretched and delayed pulses and causing the pulse path existing between said input element and said one of said first and second output element to be switched to the other of said first and second output element; and
second blocking oscillator means operatively coupled to said other of said first and second output elements for generating pulses and output terminal means operatively coupled to said first and second blocking oscillators for receiving output pulses therefrom.

References Cited

UNITED STATES PATENTS 2,647,172 7/1953 Jeanlin -------------- 331—49

ARTHUR GAUSS, *Primary Examiner.*

K. CLAFFY, *Examiner.*

S. D. MILLER, *Assistant Examiner.*